US012770247B2

(12) United States Patent
Anno

(10) Patent No.: US 12,770,247 B2
(45) Date of Patent: Oct. 20, 2026

(54) INSPECTION APPARATUS AND INSPECTION SYSTEM

(71) Applicant: CANON KABUSHIKI KAISHA, Tokyo (JP)

(72) Inventor: Makoto Anno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 363 days.

(21) Appl. No.: 18/364,323

(22) Filed: Aug. 2, 2023

(65) Prior Publication Data

US 2024/0046450 A1 Feb. 8, 2024

(30) Foreign Application Priority Data

Aug. 5, 2022 (JP) ................................. 2022-125413

(51) Int. Cl.

| | |
|---|---|
| ***B41F 33/00*** | (2006.01) |
| ***G06K 7/14*** | (2006.01) |
| ***G06T 7/00*** | (2017.01) |
| ***G06T 7/33*** | (2017.01) |
| ***G06T 7/73*** | (2017.01) |

(52) U.S. Cl.

CPC .......... *G06T 7/001* (2013.01); *B41F 33/0036* (2013.01); *G06K 7/1447* (2013.01); *G06K 7/1482* (2013.01); *G06T 7/0006* (2013.01); *G06T 7/337* (2017.01); *G06T 7/74* (2017.01); *G06T 2207/10008* (2013.01); *G06T 2207/30144* (2013.01)

(58) Field of Classification Search

CPC ....... G06T 7/001; G06T 7/0006; G06T 7/337; G06T 7/74; G06T 2207/10008; G06T 2207/30144; G06K 7/1447; G06K 7/1482; B41F 33/0036

See application file for complete search history.

(56) References Cited

U.S. PATENT DOCUMENTS

2009/0294540 A1* 12/2009 Johnson .................... B41C 1/00 101/463.1
2013/0063620 A1* 3/2013 Kim ......................... G06K 7/10 348/222.1
2014/0341437 A1* 11/2014 Araki .................... G06T 7/0008 382/112
2018/0033256 A1* 2/2018 Hamidat .............. G06K 7/1447
2019/0212955 A1* 7/2019 Gutierrez ............. G06K 15/027

(Continued)

FOREIGN PATENT DOCUMENTS

JP 2010134521 A 6/2010
JP 2022073944 A * 5/2022

*Primary Examiner* — John Villecco
*Assistant Examiner* — Kyla Guan-Ping Tiao Allen
(74) *Attorney, Agent, or Firm* — Canon U.S.A., Inc. IP Division

(57) ABSTRACT

An inspection apparatus according to exemplary embodiments of the present disclosure includes a reception unit configured to receive print data, a registration unit configured to register an image included in the print data as a reference image, an extraction unit configured to extract information relating to a barcode inspection from the received print data, and an inspection unit configured to inspect, when a scanned image generated by scanning a print product is received, a barcode in the scanned image, based on the extracted information relating to the barcode inspection.

8 Claims, 9 Drawing Sheets

(56) References Cited

U.S. PATENT DOCUMENTS

| | | | | |
|---|---|---|---|---|
| 2020/0104987 | A1* | 4/2020 | Nakano | H04N 1/00045 |
| 2021/0073967 | A1* | 3/2021 | Imai | G06T 7/001 |
| 2022/0101259 | A1* | 3/2022 | Simpson | G06V 30/1465 |
| 2023/0297297 | A1* | 9/2023 | Ishikawa | H04N 1/00074<br>358/1.15 |
| 2023/0367983 | A1* | 11/2023 | Zagaynov | G06K 7/1417 |

* cited by examiner

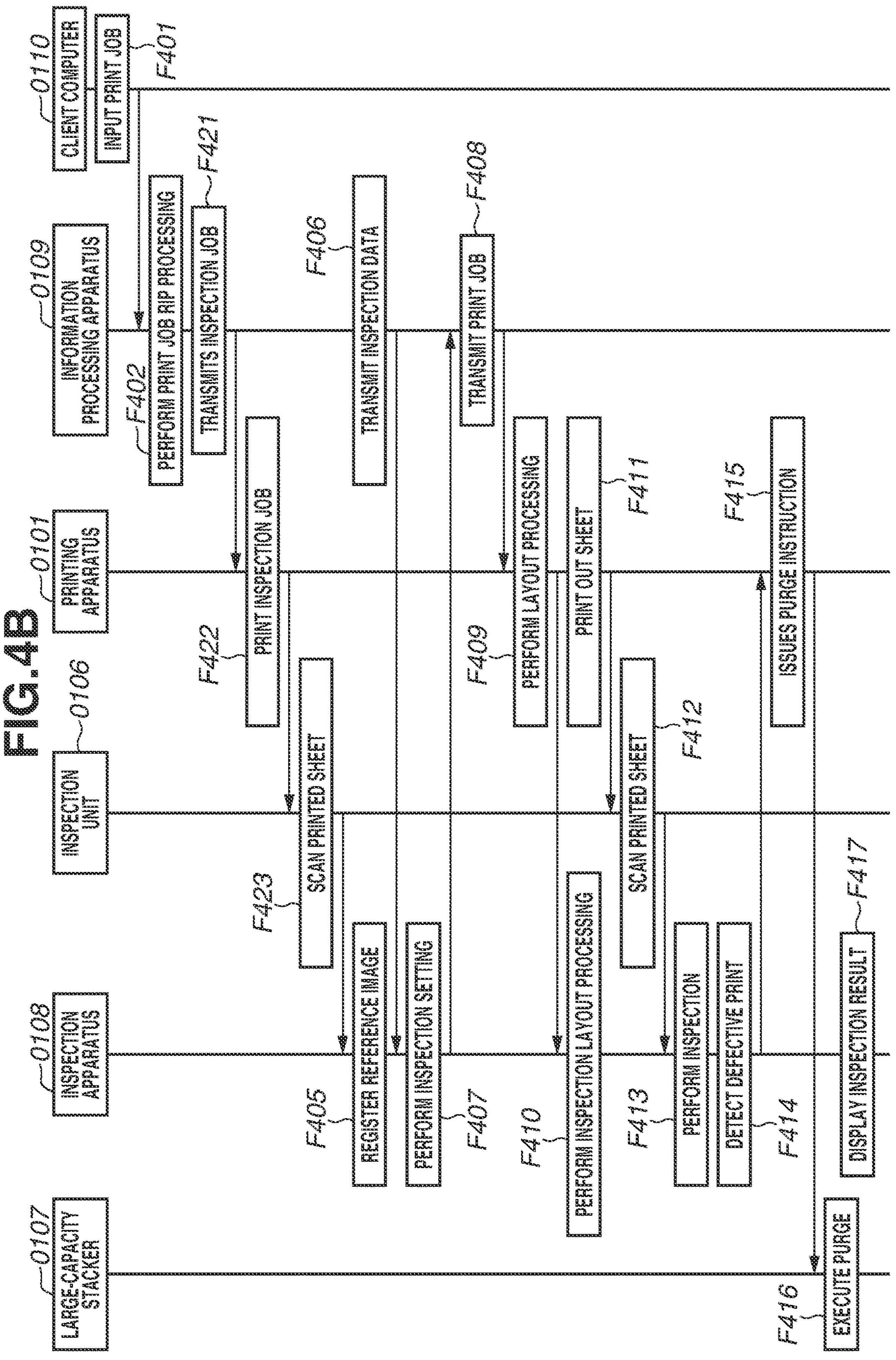
FIG.4B
0110 CLIENT COMPUTER
0109 INFORMATION PROCESSING APPARATUS
0101 PRINTING APPARATUS
0106 INSPECTION UNIT
0108 INSPECTION APPARATUS
0107 LARGE-CAPACITY STACKER
F401 INPUT PRINT JOB
F402 PERFORM PRINT JOB RIP PROCESSING
F421 TRANSMITS INSPECTION JOB
F422 PRINT INSPECTION JOB
F423 SCAN PRINTED SHEET
F405 REGISTER REFERENCE IMAGE
F406 TRANSMIT INSPECTION DATA
F407 PERFORM INSPECTION SETTING
F408 TRANSMIT PRINT JOB
F409 PERFORM LAYOUT PROCESSING
F410 PERFORM INSPECTION LAYOUT PROCESSING
F411 PRINT OUT SHEET
F412 SCAN PRINTED SHEET
F413 PERFORM INSPECTION
F414 DETECT DEFECTIVE PRINT
F415 ISSUES PURGE INSTRUCTION
F416 EXECUTE PURGE
F417 DISPLAY INSPECTION RESULT

FIG.7A

```
701 ~ #PrintJobStart
      ...
702 ~ #Barcode
703 ~ BarFontName = "JAN"
704 ~ BarFontSize = 300;
705 ~ CreateFont(BarFontSize, BarFontName);
706 ~ BarData = "123456789012";
707 ~ Output(BarcodeData);
708 ~ BarLoc = 100, 200;
709 ~ BarLevel = 4;
710 ~ #BarcodeEnd
      ...
711 ~ #PrintJobEnd
```

FIG.7B

```
      {
721 ~ BarID = 001;
722 ~ BarType = JAN;
723 ~ BarLoc = (100, 200), (400, 300);
724 ~ BarData = "123456789012";
725 ~ BarLevel = 4;
      }
      {
      BarID = 002;
      BarType = QR;
      BarLoc = (150, 250), (450, 350);
      BarData = "987654321098";
      BarLevel = 4;
      }
      ...
```

INSPECTION APPARATUS AND INSPECTION SYSTEM

BACKGROUND

Field of the Disclosure

The present disclosure relates to an inspection apparatus and an inspection system.

Description of the Related Art

There is known an inspection apparatus that reads a printed product printed by a printing apparatus to inspect the print quality of the printed product.

The inspection apparatus can detect character errors, barcode quality, and image defects such as stains and drop-outs in printing. In these inspections, a method of comparing a print product with an image having no defect registered as a reference image is used. In this method, the reference image needs to be registered to the inspection apparatus in advance. The processing to register the reference image is referred to as a reference image registration job. After finishing the reference image registration job, a user performs inspection settings of setting a region to detect defects therein in the inspection job and an acceptable threshold value to the reference image. After finishing the inspection setting, the inspection job is executed, and an inspection to detect the defects is performed by comparing the actual printed product with the registered reference image.

In the inspection setting in this case, the inspection region and the acceptable threshold value are manually set using the reference image registered to the inspection apparatus, which takes time and labor. Especially, in a case of barcode, a correct answer value needs to be registered in the inspection apparatus to perform a comparison check to check whether a value obtained by the inspection apparatus decoding a printed and scanned barcode is correct, in addition to the image quality.

Japanese Patent Application Laid-open No. 2010-134521 discusses a technique of inspection performed, when a host computer instructs a printer including a barcode inspection apparatus to perform an inspection, by transmitting to the printer information required for the barcode inspection together with a bitmap of the barcode.

SUMMARY

According to embodiments of the present disclosure, an inspection apparatus includes a reception unit configured to receive print data, a registration unit configured to register an image included in the print data as a reference image, an extraction unit configured to extract information relating to a barcode inspection from the received print data, and an inspection unit configured to inspect, when a scanned image generated by scanning a print product is received, a barcode in the scanned image, based on the extracted information relating to the barcode inspection.

Further features of the present disclosure will become apparent from the following description of exemplary embodiments with reference to the attached drawings.

BRIEF DESCRIPTION OF THE DRAWINGS

FIGS. 4A and 4B are diagrams respectively illustrating an example of a raster image processer (RIP) inspection processing flow according to the exemplary embodiment, and an example of a scan inspection processing flow according to the exemplary embodiment.

FIGS. 7A and 7B are examples of data according to the exemplary embodiment.

DESCRIPTION OF THE EMBODIMENTS

Hereinbelow, exemplary embodiments of the present disclosure will be described in detail with reference to attached drawings. Note that the following exemplary embodiments are not intended to limit the present disclosure, and the combinations of features described in the following exemplary embodiments are not necessarily essential for the solution of the present disclosure.

FIG. 1

Figure 1:
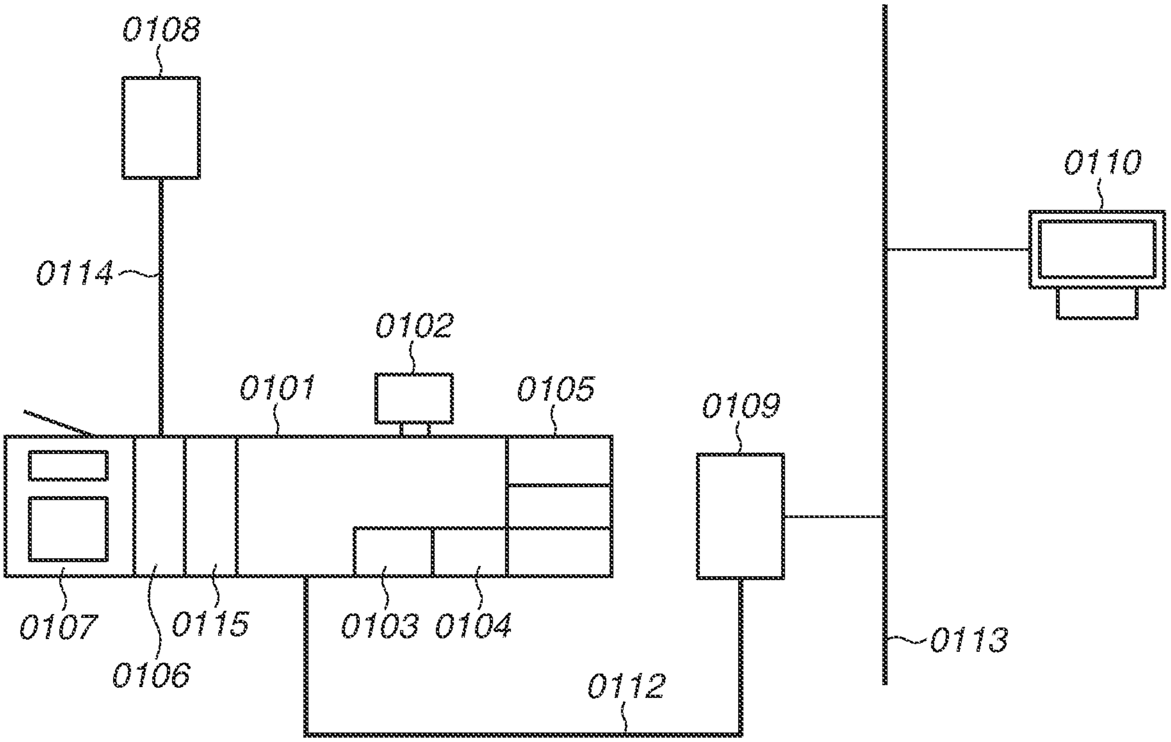
FIG. 1 is a diagram illustrating an example of a device configuration according to an exemplary embodiment.

FIG. 1 is a block diagram illustrating a configuration of an inspection system according to an exemplary embodiment. The inspection system includes a printing apparatus 0101, an inspection apparatus 0108, a large-capacity stacker 0107, an information processing apparatus 0109, a client computer 0110, and an inspection unit 0106. In addition, the printing apparatus 0101 is described using an electrophotographic printing apparatus, but may be a printing apparatus employing a different image forming method, such as an ink-jet method or an offset method. In the present exemplary embodiment, the information processing apparatus 0109 and the printing apparatus 0101 are different hardware apparatuses, but they may be integrally formed, as a so-called printer. When the information processing apparatus 0109 and the printing apparatus 0101 are formed of different hardware configurations, the information processing apparatus 0109 can be dedicated to performing raster image processor (RIP) processing on a print job (print data), and the printing apparatus 0101 can be dedicated to forming an image on a sheet. In addition, since a lot of pieces of processing hardware are included, the processing capability thereof can be enhanced as a whole.

The printing apparatus 0101 is connected with the information processing apparatus 0109 via a cable 0112. The information processing apparatus 0109 is connected with the client computer 0110 via a network 0113. The printing apparatus 0101 includes a user interface (UI) panel 0102, a paper feed deck 0103, and a paper feed deck 0104. Further, an optional deck 0105 consisting of 3-stage decks is connected to the printing apparatus 0101. The printing apparatus 0101 is, for example, an electrophotographic printing apparatus. The UI panel 0102 is, for example, a user interface provided with an electrostatic capacitance method touch panel. The printing apparatus 0101 includes the inspection unit 0106, the large-capacity stacker 0107, and an inserter 0115. The inspection unit 0106 is connected with the inspection apparatus 0108 via a cable 0114. The large-capacity stacker 0107 includes a main tray and a top tray, and thousands of sheets can be stacked in the main tray at a time. The inserter 0115 includes an inserter tray, and can insert an insertion sheet in a print job.

The print job is generated by the client computer 0110, transmitted to the information processing apparatus 0109 via the network 0113, and managed by the information processing apparatus 0109. Then, the print job is transmitted from the information processing apparatus 0109 to the printing apparatus 0101 via the cable 0112, and is processed by the printing apparatus 0101 to print on a sheet. In addition, the print job may be generated and managed in the information processing apparatus 0109, transmitted to the printing apparatus 0101 via the cable 0112, and managed by the printing apparatus 0101. In addition, the client computer 0110, the information processing apparatus 0109, and the inspection apparatus 0108 may be connected by the cable 0112 to be communicable with the printing apparatus 0101. Further, the inspection apparatus 0108 may be connected with the information processing apparatus 0109 and the client computer 0110 via the network 0113. In other words, the connection configuration of the printing apparatus 0101, the information processing apparatus 0109, and the client computer 0110 described in the present exemplary embodiment is merely an example, and obviously there are various connection configurations other than the configuration illustrated in the present exemplary embodiment. Further, a finisher that can perform stapling, a sheet folding device, and a bookbinding device may be connected to the printing apparatus 0101, in addition to the inspection unit 0106 and the large-capacity stacker 0107.

FIG. 2

Figure 2:
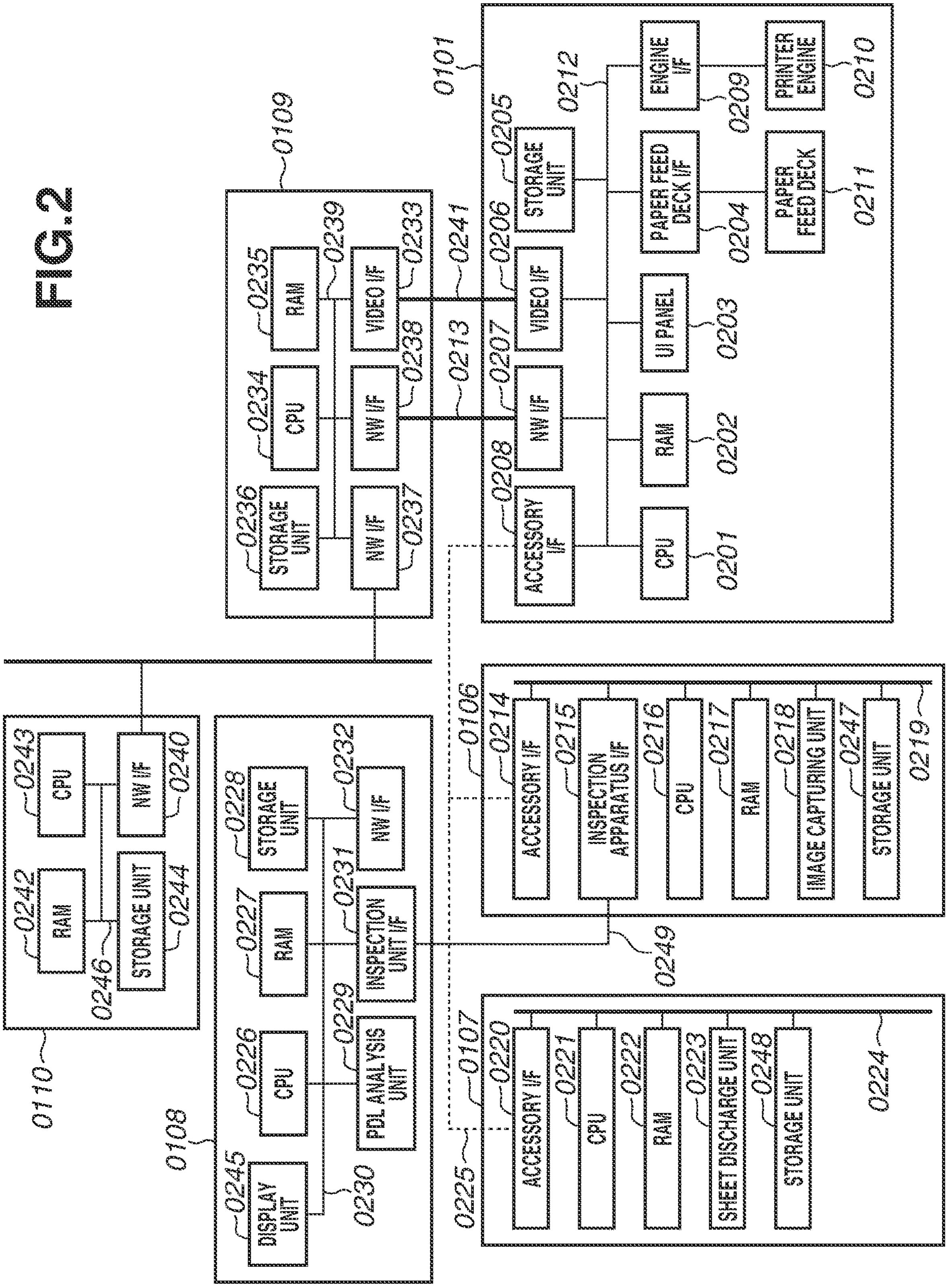
FIG. 2 is a block diagram illustrating an example of a hardware configuration according to the exemplary embodiment.

FIG. 2 is a block diagram illustrating hardware configurations of the printing apparatus 0101, the inspection apparatus 0108, the large-capacity stacker 0107, the information processing apparatus 0109, the client computer 0110, and the inspection unit 0106, according to the present exemplary embodiment. The hardware configuration of the printing apparatus 0101 is as described below.

A central processing unit (CPU) 0201 performs control and calculation for each unit in the printing apparatus 0101 via a system bus 0212. The CPU 0201 controls execution of a program stored in a storage unit 0205 and loaded into a Random Access Memory (RAM) 0202. The RAM 0202 is a type of commonly used volatile memory directly accessible by the CPU 0201, and used as a work area of the CPU 0201 or a temporary data storage area.

In general, a Hard Disk Drive (HDD) or a flash memory is used as the storage unit 0205, and the storage unit 0205 functions as a temporary storage area and a work memory when the printing apparatus 0101 operates. An engine interface (I/F) 0209 performs communication with a printer engine 0210 to control the printer engine 0210. A paper feed deck I/F 0204 performs communication with a paper feed deck 0211 and control of the paper feed deck 0211. The paper feed deck 0211 collectively refers to the paper feed decks 0103 and 0104, and the optional deck 0105, as a hard configuration.

A UI panel 0203 is a hardware configuration of the UI panel 0102, and is a user interface for performing general operations of the printing apparatus 0101. In the present exemplary embodiment, the UI panel 0203 is provided with an electrostatic capacitance method touch panel. A network (NW) I/F 0207 is connected with a NW I/F 0238 in the information processing apparatus 0109 via a cable 0213, and controls communication between the information processing apparatus 0109 and the printing apparatus 0101. In addition, in the present exemplary embodiment, the respective interfaces connected to the system bus 0212 and a system bus 0239 are directly connected with each other, but the information processing apparatus 0109 and the printing apparatus 0101 may be connected via a network, and the connection form therebetween is not limited. A video I/F 0206 is connected with a video I/F 0233 via a video cable 0241 to control communication of image data between the information processing apparatus 0109 and the printing apparatus 0101.

In addition, the connection interface in the information processing apparatus 0109 with the printing apparatus 0101 may be formed in such a manner that the functions of the NW I/F 0238 and the video I/F 0233 are integrated. Further, the connection interface in the printing apparatus 0101 with the information processing apparatus 0109 may be formed in such a manner that the functions of the NW I/F 0207 and the video I/F 0206 are integrated. An accessory I/F 0208 is connected with an accessory I/F 0214 and an accessory I/F 0220 via a cable 0225. With this configuration, the printing apparatus 0101 communicates with the inspection unit 0106 and the large-capacity stacker 0107 via the accessory I/Fs 0208, 0214, and 0220.

The hardware configuration of the inspection unit 0106 is as described below. A CPU 0216 performs control and calculation for each unit in the inspection unit 0106, and controls execution of a program stored in a storage unit 0247 and loaded into a RAM 0217, via a system bus 0219. The RAM 0217 is a type of commonly used volatile memory directly accessible by the CPU 0216, and used as a work area of the CPU 0216 or a temporary data storage area. The storage unit 0247 functions as a temporary storage area and a work memory when the inspection apparatus 0108 operates. An inspection apparatus I/F 0215 is connected with an inspection unit I/F 0231 via a cable 0249. With this configuration, the inspection unit 0106 communicates with the inspection apparatus 0108 via the inspection apparatus I/F 0215 and the inspection unit I/F 0231.

An image capturing unit 0218 includes, for example, a contact image sensor (CIS) to achieve an image capturing function, captures an image on a sheet passing through the inspection unit 0106, and transmits the captured image to the inspection apparatus 0108 via the inspection apparatus I/F 0215. In addition, the CIS in the image capturing unit 0218 is an example of a sensor, other sensors such as a charge-coupled device (CCD) image sensor may be used, and the image capturing method is not limited. There are two purposes to transmit the captured image. One is, regardless of the inspection method, to capture an image of a print product of an inspection target print job to transmit the captured image to the inspection apparatus 0108 for inspection. The other one is, in a case where the inspection method is a scan inspection method, to print and capture one or more copies of print jobs for generating a reference image before the inspection target print job, and to transmit the generated reference image to the inspection apparatus 0108.

Here, the inspection methods will be described. The inspection methods include at least two types of methods classified depending on the difference of the reference image generation method. These are a method of using, as a reference image, a scan image of a once printed print product, and a method of using, as a reference image, an image before printing such as a RIP image obtained by rasterizing a print job described in a page description language (PDL) into a raster image. In the present exemplary embodiment, the inspection method of using a scan image as a reference image is referred to as a scan inspection, and the inspection method of using a RIP image as a reference image is referred to as a RIP inspection.

The hardware configuration of the large-capacity stacker 0107 is as described below. A CPU 0221 performs control and calculation for each unit in the large-capacity stacker 0107, and controls execution of a program stored in a storage unit 0248 and loaded into a RAM 222, via a system bus 0224. The RAM 0222 is a type of commonly used volatile memory directly accessible by the CPU 0221, and used as a work area of the CPU 0221 or a temporary data storage area. The storage unit 0248 functions as a temporary storage area and a work memory when the inspection apparatus 0108 operates. A sheet discharge unit 0223 performs monitoring and controlling the sheet discharge operation to the main tray and the top tray, and the stack state in each of the main tray and the top tray.

The hardware configuration of the inspection apparatus 0108 is as described below. A CPU 0226 performs control and calculation for each unit in the inspection apparatus 0108, and controls execution of a program stored in a storage unit 0228 and loaded into a RAM 0227, via a system bus 0230. The RAM 0227 is a type of commonly used volatile memory directly accessible by the CPU 0226, and used as a work area of the CPU 0226 or a temporary data storage area. A storage unit 0228 functions as a temporary storage area and a work memory used when the inspection apparatus 0108 operates, and stores the transmitted image as a reference image in the storage unit 0228. A PDL analysis unit 0229 reads a print job described in the PDL, such as Portable Document Format (PDF), PostScript, or Printer Control Language (PCL), and received from the client computer 0110 or the information processing apparatus 0109, and executes interpretation processing. A display unit 0245 is, for example, a liquid crystal display connected to the inspection apparatus 0108, and receives a user's input to the inspection apparatus 0108, or displays the state of the inspection apparatus 0108. A NW I/F 0232 performs communications with the information processing apparatus 0109 and the client computer 0110, respectively via a NW I/F 0237 and a NW I/F 0240.

The hardware configuration of the information processing apparatus 0109 is as described below. A CPU 0234 performs control and calculation for each unit in the information processing apparatus 0109, and controls execution of a program stored in a storage unit 0236 and loaded into a RAM 0235, via the system bus 0239. The RAM 0235 is a type of commonly used volatile memory directly accessible by the CPU 0234, and used as a work area of the CPU 0234 or a temporary data storage area. The storage unit 0236 functions as a temporary storage area and a work memory used when the information processing apparatus 0109 operates. The NW I/F 0237 is connected with the NW I/F 0240 via a network.

In addition, the information processing apparatus 0109 communicates with the client computer 0110 via the NW I/F 0237 and the NW I/F 0240. Alternatively, the inspection apparatus 0108 may include a NW I/F, and the information processing apparatus 0109 may communicate with the inspection apparatus 0108 via the NW I/F and the NW I/F 0237. For example, as the inspection method, consider a case of the RIP inspection in which a RIP image, which is used by the printing apparatus 0101 for printing, is used as a reference image.

In this case, the reference image may be transmitted to the inspection apparatus 0108 via the inspection apparatus I/F 0215, or may be transmitted to the inspection apparatus 0108 via the NW I/F 0207, the NW I/F 0237, and the NW I/F included in the inspection apparatus 108.

The hardware configuration of the client computer 0110 is as described below. A CPU 0243 performs control and calculation for each unit in the client computer 0110, and controls execution of a program stored in a storage unit 0244 and loaded into a RAM 0242, via a system bus 0246. A RAM 0242 is a type of commonly used volatile memory directly accessible by the CPU 0243, and used as a work area of the CPU 0243 or a temporary data storage area. The storage unit 0244 functions as a temporary storage area and a work memory used when the client computer 0110 operates.

FIGS. 3A to 3F

Figure 3A:
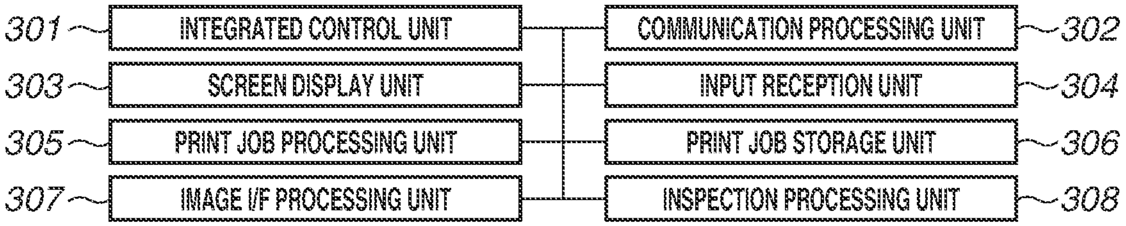
FIGS. 3A to 3F are functional block diagrams each illustrating an example of an apparatus according to the exemplary embodiment.

The software functional block configuration according to the present exemplary embodiment will be described. FIG. 3A is a functional block diagram of the information processing apparatus 0109. Functional blocks in FIG. 3A are implemented by the CPU 0234 reading a program stored in the storage unit 0236, loading the program into the RAM 0235, and executing the loaded program.

A print job processing unit 305 processes a print job received from the client computer 0110. For example, the print job processing unit 305 performs so-called RIP processing for interpreting the PDL, which is text/image data, and converting it into a raster image. A print job storage unit 306 stores the print job received from the client computer 0110, associates the raster image generated after the RIP processing with a print processing setting, and stores it.

An image I/F processing unit 307 transmits the raster image to the printing apparatus 0101.

A communication processing unit 302 receives a print job from the client computer 0110, and transmits an inspection content described below to the inspection apparatus 0108. Further, the communication processing unit 302 transmits to the printing apparatus 0101 print processing settings about, for example, double-sided printing or punching, in cooperation with the image I/F processing unit 307. The transmission and reception are performed by the NW I/F 0237 or the NW I/F 0238. The communication processing unit 302 performs switching processing to determine which hardware configuration to use and with which apparatus to communicate depending on the network protocol such as Transmission Control Protocol/Internet Protocol (TCP/IP).

An inspection processing unit 308 extracts a barcode position and barcode data to generate information (hereinbelow, referred to as an inspection content) used for inspection. The inspection processing unit 308 generates the inspection content in a case where the print job processing unit 305 detects a PDL code describing a barcode, which is an inspection target, when the print job processing unit 305 processes the print job.

In addition, the barcode data in the present exemplary embodiment is a numerical value or a character string value to be converted into a barcode. Further, the barcode data is also a correct answer value for a value obtained by decoding a printed barcode object.

A screen display unit 303 displays an operation menu, a state of the information processing apparatus 0109, or the like on a display screen (not illustrated) included in the information processing apparatus 0109 as a hardware configuration. An input reception unit 304 receives an instruction input by a user via a keyboard or a mouse (not illustrated). An integrated control unit 301 integrally processes these processing units.

Figure 3B:
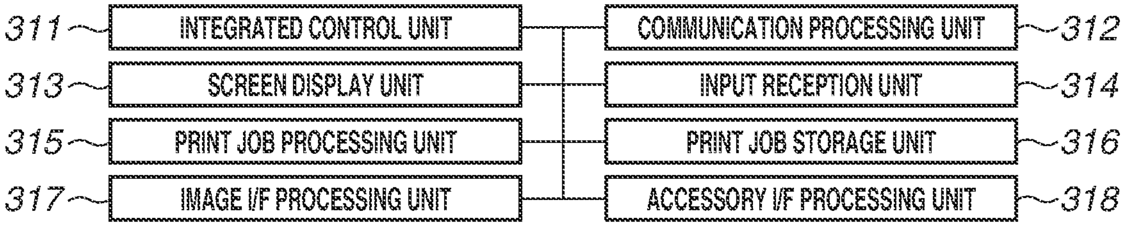

FIG. 3B is a functional block diagram of the printing apparatus 0101. Functional block in FIG. 3B are implemented by the CPU 0201 reading a program stored in the storage unit 0205, loading the program into the RAM 0202, and executing the loaded program.

An image I/F processing unit 317 receives a raster image from the image I/F processing unit 307 of the information processing apparatus 0109. A communication processing unit 312 receives a print processing setting from the communication processing unit 302 of the information processing apparatus 0109. A print job processing unit 315 associates and processes the raster image and the print processing setting received from the information processing apparatus 0109, as a print job. A print job storage unit 316 temporarily stores the print job processed by the print job processing unit 315 until the processed print job is printed on a recording sheet such as paper.

An accessory I/F processing unit 318 is an interface for instructing each accessory connected to the printing apparatus 0101 at a time of printing out, to perform processing. For example, the accessory I/F processing unit 318 instructs the accessory to discharge a sheet determined to be a defective print as an inspection result to the top tray of the large-capacity stacker 0107.

A screen display unit 313 displays an operation menu, a state of the printing apparatus 0101, or the like on the UI panel 0203 included in the printing apparatus 0101 as a hardware configuration. An input reception unit 314 receives an instruction input by a user via the UI panel 0203. An integrated control unit 311 integrally processes these processing units.

Figure 3C:
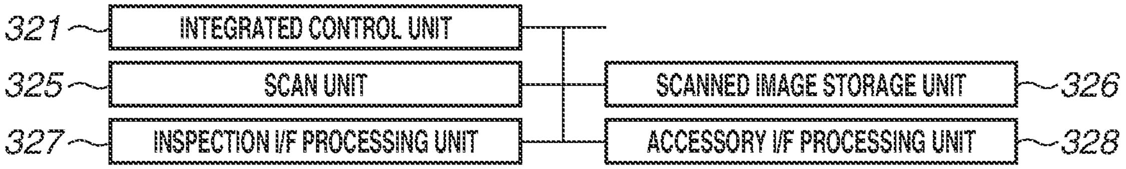

FIG. 3C is a functional block diagram of the inspection unit 0106. Functional blocks in FIG. 3C are implemented by the CPU 0216 reading a program stored in the storage unit 0247, loading the program into the RAM 0217, and executing the loaded program.

After the printing apparatus 0101 print out a sheet, the sheet discharged from the printing apparatus 0101 is conveyed to the inspection unit 0106 via the inserter 0115.

An accessory I/F processing unit 328 receives a scan instruction from the accessory I/F processing unit 318 of the printing apparatus 0101. This is a scan instruction to execute inspection processing.

Upon receiving the scan instruction, a scan unit 325 scans the image printed on the conveyed sheet. A scanned image storage unit 326 temporarily stores the scanned image. An inspection I/F processing unit 327 transfers the stored scanned image to the inspection apparatus 0108. An integrated control unit 321 integrally processes these processing units.

Figure 3D:
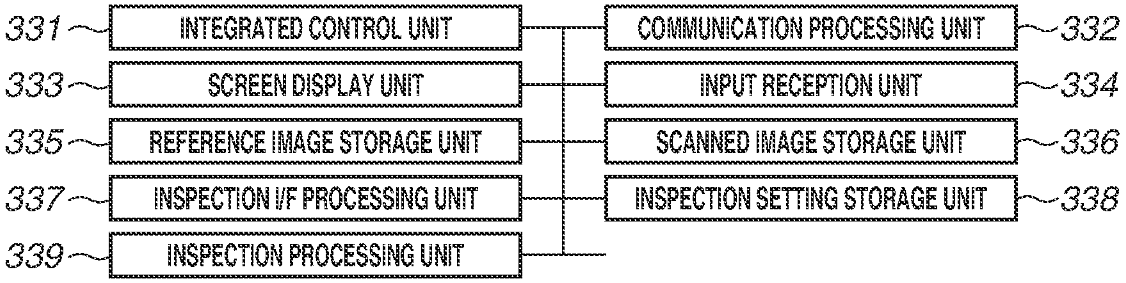

FIG. 3D is a functional black diagram of the inspection apparatus 0108. The functional blacks are implemented by the CPU 0226 reading a program stored in the storage unit 0228, loading the program into the RAM 0227, and executing the loaded program.

An inspection I/F processing unit 337 receives the scanned image transferred from the inspection I/F processing unit 327 of the inspection unit 0106. A scanned image storage unit 336 stores the received scanned image. A reference image storage unit 335 stores an image received as a reference image. In a case of the RIP inspection, an image generated by performing RIP processing on a print job by the information processing apparatus 0109 is received and stored as the reference image. The details thereof will be described below. In a case of the scan inspection, the image scanned by the inspection unit 0106 at a time of the reference image registration is received by the inspection I/F processing unit 337 and stored in the reference image storage unit 335 as the reference image.

An inspection setting storage unit 338 stores inspection setting regarding, for example, an area to be a target of detecting a defective print, or a threshold value, used when the inspection is performed. The inspection setting storage unit 338 receives and temporarily stores the inspection content generated when the information processing apparatus 0109 performs the RIP processing on the print job, and the inspection content is read out and edited and set by a user to determine an inspection setting. The inspection setting storage unit 338 stores the inspection setting determined by the user. The details will be described below. An inspection processing unit 339 compares the reference image and the scanned image according to the inspection setting, to perform the inspection. A communication processing unit 332 transmits and receives various kinds of data to and from the communication processing unit 302 of the information processing apparatus 0109 or a communication processing unit 342 of the client computer 0110 to be described below. A screen display unit 333 displays an operation menu, a state of the apparatus, or the like on a display screen (not illustrated) included in the information processing apparatus 0109 as a hardware configuration. An input reception unit 334 receives an instruction input by a user via a keyboard or a mouse (not illustrated). An integrated control unit 331 integrally processes these processing units.

Figure 3E:
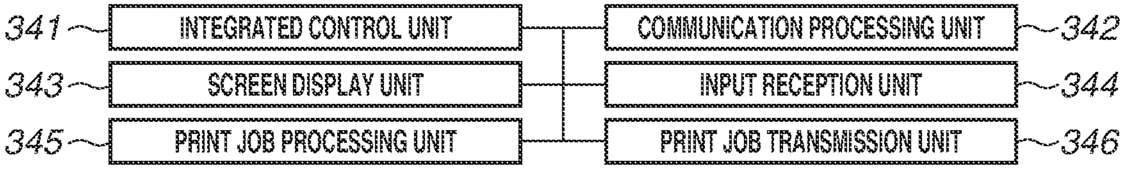

FIG. 3E is a functional block diagram of the client computer 0110. Functional blacks in FIG. 3E are implemented by the CPU 0243 reading a program stored in the storage unit 0244, loading the program into the RAM 0242, and executing the loaded program.

A print job processing unit 345 generates a print job in the PDL upon receiving a print instruction from a user via an application. A print job transmission unit 346 transmits the generated print job to the information processing apparatus 0109. At this time, the communication processing unit 342 transmits the generated print job. A screen display unit 343 displays an operation menu, a state of the apparatus, or the like on a display screen (not illustrated) included in the client computer 0110 as a hardware configuration. An input reception unit 344 receives an instruction input by a user via a keyboard or a mouse (not illustrated). An integrated control unit 341 integrally processes these processing units.

Figure 3F:
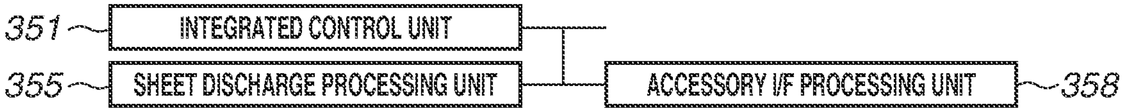

FIG. 3F is a functional block diagram of the large-capacity stacker 0107. Functional blacks in FIG. 3F are implemented by the CPU 0221 reading a program stored in the storage unit 0248, loading the program into the RAM 0222, and executing the loaded program.

An accessory I/F processing unit 358 receives an instruction relating to sheet conveyance processing from the accessory I/F processing unit 318 of the printing apparatus 0101. A sheet discharge processing unit 355 discharges a sheet conveyed in response to the instruction to the main tray or the top tray of the large-capacity stacker 0107. An integrated control unit 351 integrally processes these processing units.

Figure 4A:
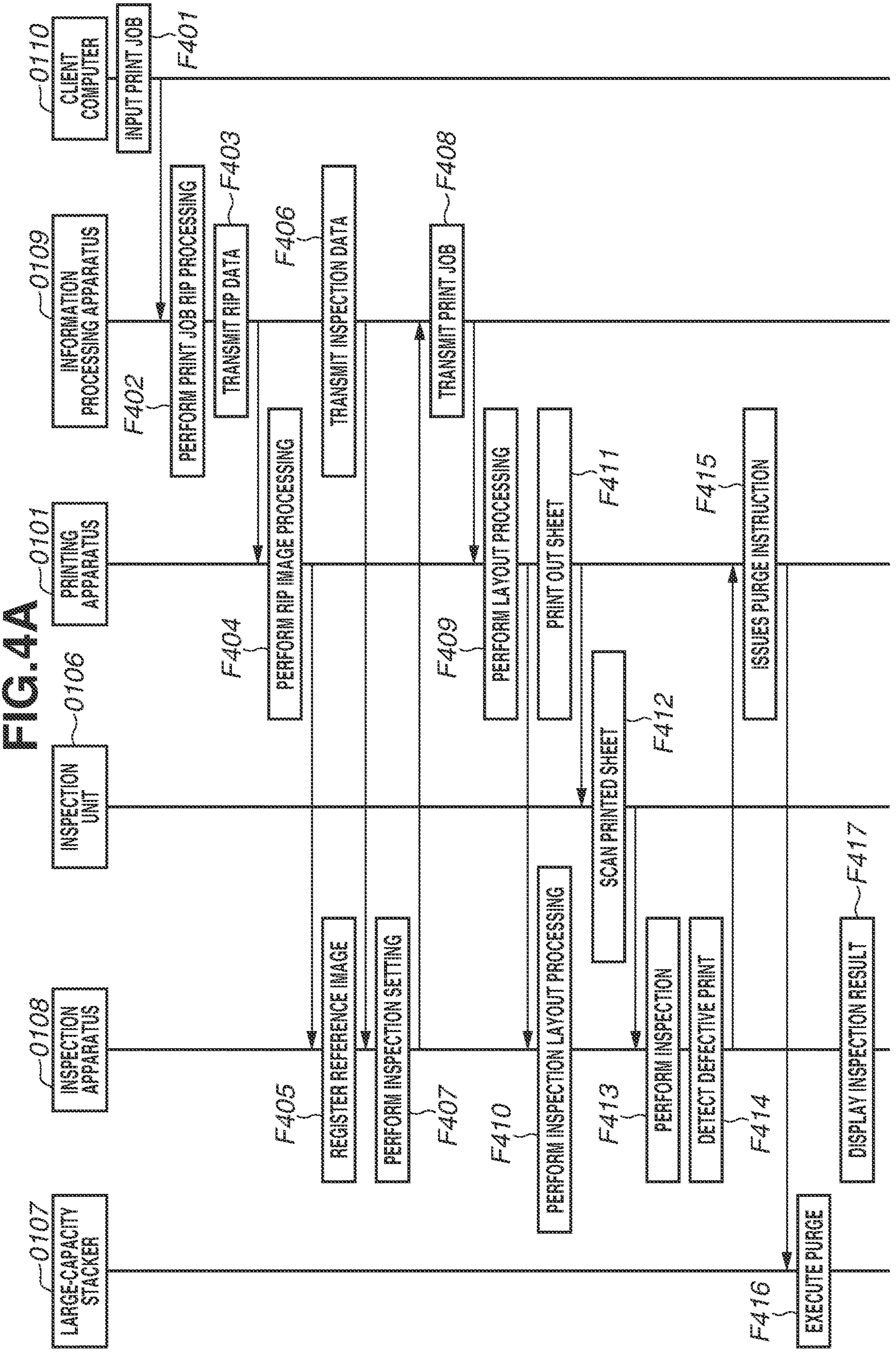

FIGS. 4A and 4B

Next, flows of inspection processing according to the present exemplary embodiment will be described. FIG. 4A illustrates a flow of the RIP inspection processing. This processing is performed by the client computer 0110, the information processing apparatus 0109, the printing apparatus 0101, the inspection unit 0106, the inspection apparatus 0108, and the large-capacity stacker 0107 in cooperation with each other. Here, the outline of the flow will be described, and the details of the processing performed by each apparatus will be described below.

First, in step F401, the client computer 0110 generates a print job to be inspected, and inputs the generated print job to the information processing apparatus 0109. In step F402, the information processing apparatus 0109 performs RIP processing on the PDL data of the received print job. At this time, a value indicating a barcode is set in an image area flag of each pixel of the barcode. The image area flag will be described in detail below, with reference to FIGS. 6A and 6B. Subsequently, in step F403, the information processing apparatus 0109 transmits the print data after the RIP processing to the printing apparatus 0101, as a reference image registration job for registering a reference image. In step F404, upon receiving the print data of the reference image registration job, the printing apparatus 0101 performs image processing to be performed in the printing apparatus 0101. Further, the printing apparatus 0101 transmits the reference image in a format determined in advance, to the inspection apparatus 0108. In step F405, the inspection apparatus 0108 registers the received reference image in an image format suitable for inspection processing as a reference image. In parallel with the reference image registration processing in the inspection apparatus 0108, in step F406, the information processing apparatus 0109 generates inspection data relating to the inspection of the barcode extracted when the print job is subjected to the RIP processing in step F402, and transmits the generated inspection data to the inspection apparatus 0108. In step F407, upon receiving the inspection data, the inspection apparatus 0108 performs inspection setting.

At this time, the inspection apparatus 0108 performs the inspection setting relating to the barcode inspection using the received inspection content. The inspection content includes position information of the barcode calculated from the image area flags in the RIP data of the reference image, barcode data included in the received inspection data, and an inspection criterion. At this time, the inspection apparatus 0108 may automatically perform the inspection setting, or may determine the inspection setting after a user checks the inspection setting automatically performed. Further, in step F407, the inspection apparatus 0108 may receive from a user the image inspection setting, or other settings relating to the data inspection, in addition to the inspection setting relating to the barcode inspection. Upon completing the inspection setting, the inspection apparatus 0108 notifies the information processing apparatus 0109 of the completion of the inspection setting. The preparation processing for the inspection is as described above.

After the inspection preparation, the inspection job is executed next. In step F408, upon receiving the inspection setting completion notification from the inspection apparatus 0108, the information processing apparatus 0109 transmits to the printing apparatus 0101 the RIP data subjected to the RIP processing in step F402, as an inspection job for printing the image on a sheet and checking the printed image. In addition, since the RIP data transmitted for the reference image registration in step F403, and the RIP data transmitted in step F408 are the data indicating the same image, the information processing apparatus 0109 may instruct the printing apparatus 0101 to print the data transmitted in step F403, without transmitting the RIP data again.

In step F409, upon receiving the inspection job, the printing apparatus 0101 performs the image processing similar to that in step F404, and further performs layout processing. The layout processing is processing to detect a setting of, for example, 2-in-1 (layout in which 2 pages are arranged in a sheet), or short-side binding or long-side binding, and to arrange the images as set in the setting. Further, the printing apparatus 0101 transmits the layout format performed in the layout processing to the inspection apparatus 0108, as information. This is because the inspection apparatus 0108 receives the printed sheet scanned by the inspection unit 0106 (described below) to perform the inspection processing, and thus, needs to reflect the layout format to the reference image registered in step F405. In step F410, the inspection apparatus 0108 reflects the received layout information on the inspection setting made in step F407.

Thus, the inspection apparatus 0108 receives the scanned image generated by scanning the print product. Then, the CPU 226 reflects the extracted information relating to the barcode inspection on the inspection setting. Then, the CPU 226 inspects the barcode in the scanned image based on the extracted information relating to the barcode inspection.

Upon completing the layout processing in step F409, in step F411, the printing apparatus 0101 forms an image on a recording sheet such as paper, and prints out the sheet. When the printed sheet is output from the printing apparatus 0101, the printed sheet is conveyed along a sheet conveyance path to the inspection unit 0106. In step F412, the inspection unit 0106 scans the conveyed printed sheet, and transmits the generated image data to the inspection apparatus 0108. The inspection apparatus 0108 temporarily stores the image data received from the inspection unit 0106, and executes the inspection. More specifically, in step F413, the inspection apparatus 0108 performs the inspection by comparing the scanned image and the corresponding reference image, and the barcode inspection, using the position of the barcode processed in steps F407 and F410, and the barcode data, and the inspection criterion as a reference. In this case, the barcode inspection is an inspection, for example, to inspect whether the value obtained by decoding the barcode is correct, or whether accuracy when the barcode is decoded reaches an acceptable quality level. In step F414, if determining that the inspection result is a defective print, the inspection apparatus 0108 notifies the printing apparatus 0101 accordingly. In step F415, the printing apparatus 0101 issues a purge instruction to the large-capacity stacker 0107 to discharge the sheet determined to be the defective print to a place different from a discharge destination for normal sheets, which is referred to as a purge.

In step F416, upon receiving the purge instruction, the large-capacity stacker 0107 discharge the defective sheet to the top tray, which is referred to as a purge execution. At last, all the pages are printed and the inspection is completed, in step F417, the inspection apparatus 0108 displays the inspection result.

The RIP inspection processing flow is performed as described above. In addition, at least the processing in steps F411 to F416 is performed on each sheet, and repeated until the printing of all the pages is completed.

The present exemplary embodiment is described using the example in which the information processing apparatus 0109 and the inspection apparatus 0108 are communicably connected. However, as an inspection system, there may be a case where the information processing apparatus 0109 and the printing apparatus 0101 are communicable, the printing apparatus 0101 and the inspection apparatus 0108 are communicable, but the information processing apparatus 0109 and the inspection apparatus 0108 are not directly communicable. In this case, the inspection system may be configured in such a manner that the information processing apparatus 0109 and the inspection apparatus 0108 exchange information via the printing apparatus 0101 in steps F406 and F407.

FIG. 4B illustrates a processing flow of the scan inspection. The same steps as those in the RIP inspection are assigned the same step names and symbols. Only the different steps will be described.

In the RIP inspection described with reference to FIG. 4A, the RIP image is registered as the reference image.

On the other hand, the scan inspection is different from the RIP inspection in that a scanned image obtained by scanning a print output sheet is registered as a reference image. Accordingly, in step F421, the information processing apparatus 0109 transmits the inspection job after the processing in step F402. In step F422, upon receiving the inspection job, the printing apparatus 0101 forms an image on a sheet, and outputs the printed sheet. In step F423, the inspection unit 0106 scans the printed sheet with the image formed thereon. Thereafter, the same processing as that of the RIP inspection is performed.

The scan inspection is advantageous in that the inspection can be performed only by adding the inspection unit 0106 and the inspection apparatus 0108, because the processing by the information processing apparatus 0109 and the printing apparatus 0101 is not different from the normally performed printing processing including no inspection. However, there is an issue of wasting paper and taking time and effort, because a print image to be inspected needs to be printed and scanned by the inspection unit 0106.

The present exemplary embodiment will be described based on an assumption that the RIP inspection is employed although the present exemplary embodiment is applicable to both of the RIP inspection and the scan inspection.

Figure 5:
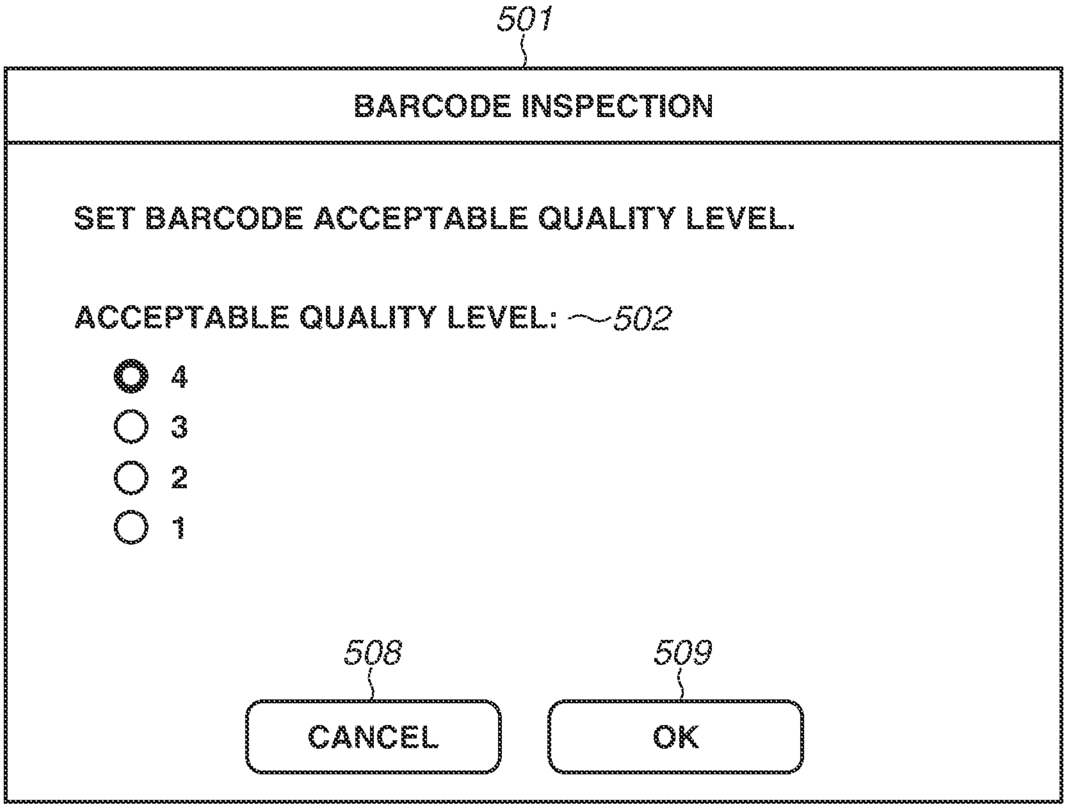
FIG. 5 is a diagram illustrating an example of an acceptable quality level setting screen according to the exemplary embodiment.

FIG. 5, and FIGS. 7A and 7B

A setting screen of an operation unit according to the present exemplary embodiment will be described.

FIG. 5 illustrates a screen 501 displayed by the screen display unit 343 of the client computer 0110, and used to set an acceptable quality level of the barcode. The acceptable quality level of the barcode is indicated by four levels such as quality levels 4, 3, 2, and 1, or A, B, C, and D in descending order of quality, according to, for example, Japanese Industrial Standards (JIS) X 0502 standard. The highest grade "4" or "A" indicates a quality level capable of reading by one scan. An acceptable quality level 502 is configured to be selectable from grades each provided with a radio button. After selecting an acceptable quality level, a user determines the selected acceptable quality level using an "OK" button 509. In a case of canceling the selection, the user presses a "CANCEL" button 508.

The acceptable quality level set on this screen is set in the print job generated by the print job processing unit 345. FIG. 7A illustrates an example of a print job including a barcode described in PDL. The job starts from #PrintJobStart 701, and ends at #PrintJobEnd 711. In a case where a barcode is used in a job, it is described in a part starting from #Barcode 702 and ending at #BarcodeEnd 710. BarFontName 703 defines a type of barcode indicated by a barcode font. There are various types of barcodes such as a one-dimensional code (e.g., Japan Article Number (JAN) code and CODE 39), and a two-dimensional code (e.g., Quick Response (QR®) code and Portable Data File (PDF) 417). In addition, it is known that the barcode font is a font for displaying values of numerals and character strings converted in a barcode. In other words, the barcode font defines which type of barcode a value to be described below is converted into.

BarFontSize 704 defines the size of the converted barcode. CreateFont 705 indicates that the barcode is generated according to the definition values of the BarFontName 703 and the BarFontSize 704. BarData 706 defines values of numerals or character strings to be converted in the barcode. Output 707 indicates completing the barcode by outputting the values to the barcode generated by the CreateFont 705. As an example, the numerals "123456789012" are generated as a barcode of JAN with a size 300. BarLoc 708 defines a position of the generated barcode to be arranged in a page. As an example, the barcode is rendered from a position shifted from a rendering reference point by +100 in an X axis direction, and +200 in a Y axis direction. BarLevel 709 defines the acceptable quality level of the barcode set on the setting screen in FIG. 5.

Since the user selects "4" in FIG. 5, BarLevel 709 is "4" in the example of FIG. 7A.

The client computer 0110 generates the print job including the barcode described in PDL as described above, and transmits the generated job to the information processing apparatus 0109.

Figure 6A:
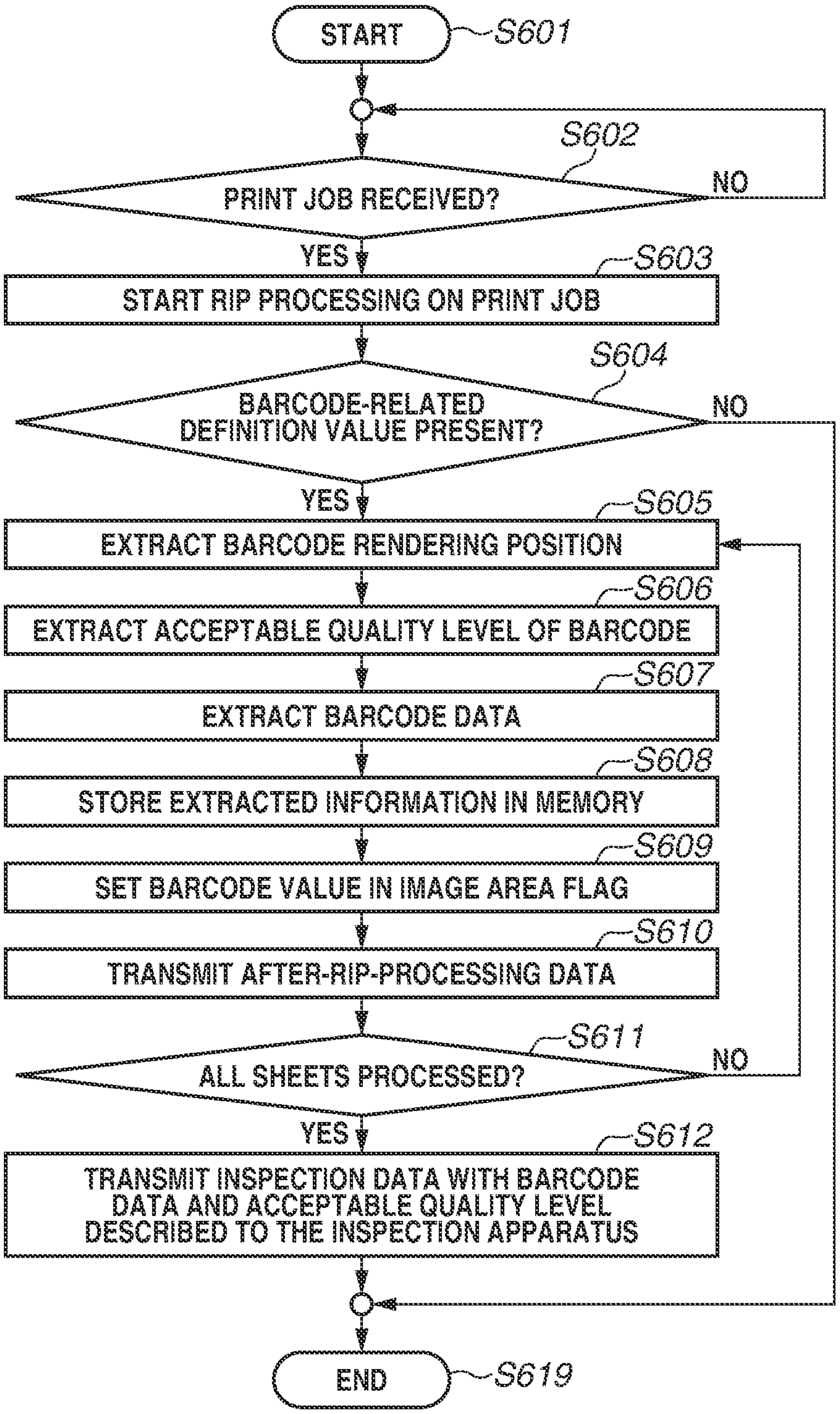
FIGS. 6A and 6B are flowcharts respectively illustrating processing of an information processing apparatus according to the exemplary embodiment, and processing of an inspection apparatus according to the exemplary embodiment.
Figure 6B:
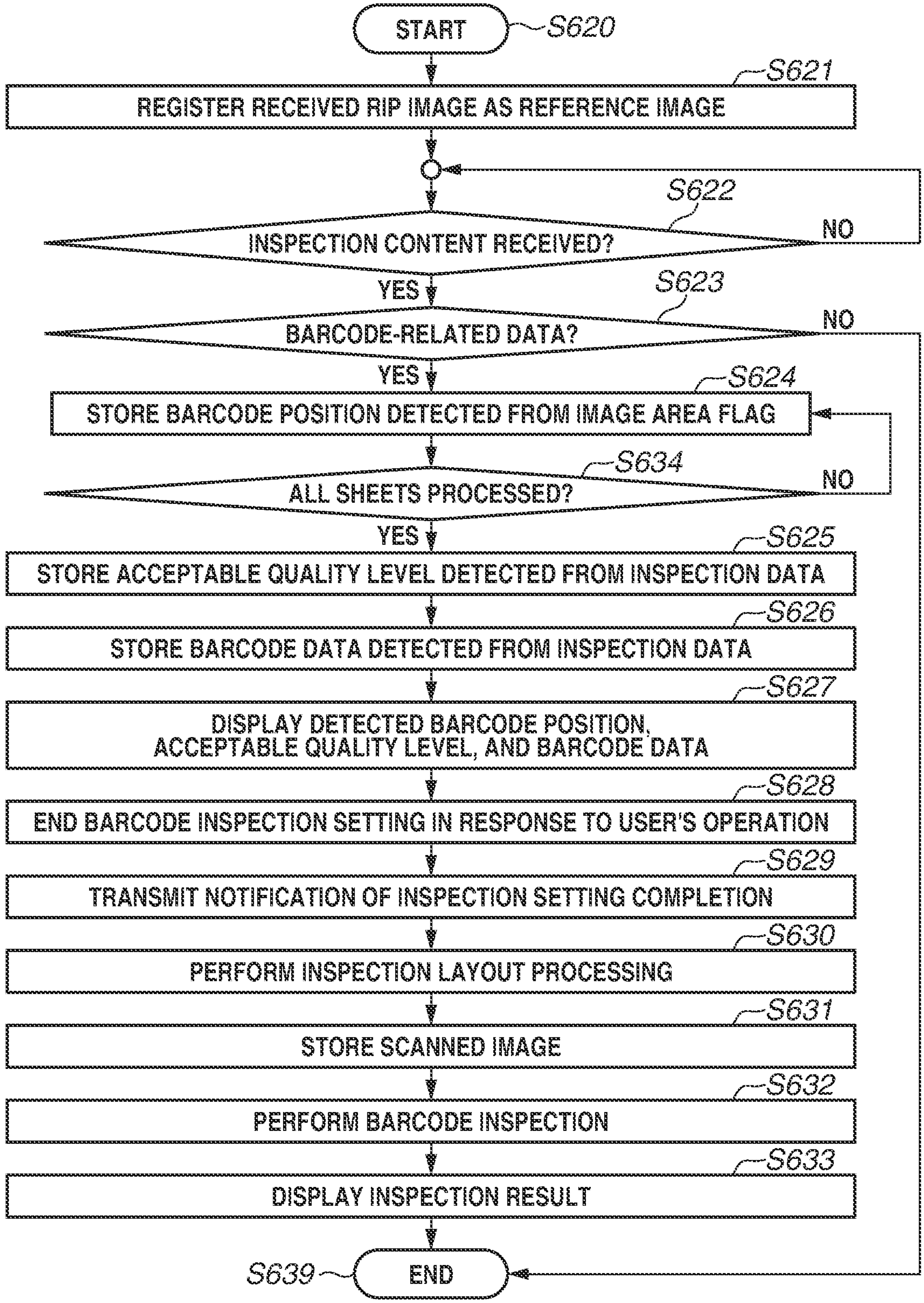

FIGS. 6A and 6B

A processing flow according to the present exemplary embodiment will be described.

FIG. 6A is a flowchart illustrating a processing flow of the information processing apparatus 0109. This processing flow is implemented by the CPU 0234 reading a program stored in the storage unit 0236, loading the program into the RAM 0235, and executing the loaded program.

In step S601, the processing flow starts. In step S602, the integrated control unit 301 determines whether a print job is received by the communication processing unit 302. This processing is repeated until the communication processing unit 302 receives a print job. In step S602, when the communication processing unit 302 receives a print job (YES in step S602), the print job storage unit 306 stores the received print job, and the processing proceeds to step S603. In step S603, the print job processing unit 305 starts RIP processing on the stored print job. In step S604, the print job processing unit 305 determines whether a barcode-related definition value is present in the print job. This determination is performed by the print job processing unit 305 interpreting the PDL describing the print job and determining whether a definition value such as the BarFontName 703 as described with reference to FIG. 7A as an example is present. In a case where a definition value is present (YES in step S604), the inspection processing unit 308 performs processing to extract information required for generating the inspection content of the barcode, as will be described in steps S605 to S608, in parallel with the processing in which the print job processing unit 305 generates the raster image with the normal RIP processing and stores it in the print job storage unit 306. Then, the processing proceeds to step S605. In step S605, the inspection processing unit 308 extracts a rendering position of the barcode. The rendering position of the barcode is extracted by interpreting the BarLoc 708.

Next, in step S606, the inspection processing unit 308 extracts an acceptable quality level of the barcode. The acceptable quality level of the barcode is extracted by interpreting the BarLevel 709. At last, in step S607, the inspection processing unit 308 extracts data of the barcode. The data of the barcode is extracted by processing the BarData 706. In step S608, the extracted information is stored in a memory.

A method of transmitting the inspection-related values of the extracted barcode to the inspection apparatus 0108 will be described more specifically. First, the rendering position of the barcode will be described. A raster image after RIP processing may be sometimes provided with image area flags each indicating a feature of a pixel such as a text, a graphic, or an image. The image area flag is configured of a plurality of bits for one pixel, and a text, a graphic, an image, or the like is indicated by the bit value of the bits. In a case where the inspection of the barcode is performed, by defining a value indicating a barcode in a not used bit value of the image area flag of each pixel that renders a barcode, it is possible to indicate that the pixel is (is included in) a barcode using the defined value. Thus, the bit value of the image area flag of the pixel is a value indicating a barcode, the pixel is a barcode. The barcode has a certain degree of rendering area, and the image area flags of a plurality of pixels have the value. In addition, the image area flags of all the pixels may not be set to the value, and only pixels on a border may be set to the value so that the barcode area can be recognized. Further, since the barcode has a rectangular shape, only two points of a rendering start point and a rendering end point need to be indicated. For example, only the start point (X1, Y1) and the end point (X2, Y2) may be indicated. Further, in the present exemplary embodiment, the information indicating the barcode position is stored by defining the value indicating the barcode in the unused bit value of the image area flag, but it is not limited thereto. For example, a value indicating the acceptable quality level may be defined in the unused bits. Further, unused bits of a plurality of pixels may be collected to store the barcode data therein.

In this way, in step S609, the value indicating the barcode is set in the image area flag. The inspection processing unit 308 stores in the print job storage unit 306 the data of the image area flag with the value indicating the barcode set. In step S610, the integrated control unit 301 transmits the raster image and the image area flags stored in the print job storage unit 306, as the RIP data after RIP processing, to the printing apparatus 0101 via the image I/F processing unit 307. The above-described processing in steps S605 to S610 is performed on each sheet. The sheet in this case is a logical page of the print job, and when layout processing of "2-in-1" is performed, two pages are arranged in a sheet of paper. Then, in step S611, the integrated control unit 301 determines whether all sheets have been processed. If all the sheets have not been processed (NO in step S611), the processing returns to step S605 to perform the processing on the next sheet. If all the sheets have been processed (YES in step S611), the processing proceeds to step S612. In this way, the processing in steps S605 to 610 is performed on all the sheets in the job.

Next, the integrated control unit 301 describes in the inspection data the acceptable quality level of the barcode and the data of the barcode extracted in steps S606 and S607 and stored in the memory in step S608, and transmits the inspection data to the inspection apparatus 0108. The inspection data is file data, and an example is illustrated in FIG. 7B. The example in FIG. 7B illustrates a case where a plurality of barcodes is present in a print job, and first two barcodes are illustrated. A unique value is assigned in BarID 721 so as to be able to distinguish a barcode from other barcodes even in a case where a plurality of barcodes is present. The type of the barcode is indicated in BarType 722. In the example in FIG. 7B, the type of the barcode with the BarID 721 being "001" is "JAN". The barcode position is indicated by BarLoc 723. In this example, since the barcode has a rectangular shape, the barcode is indicated by two points including a rendering start point and a rendering end point. In addition, in a case where the barcode position is indicated using the image area flags, the BarLoc 723 is not required. The data of the barcode is indicated by BarData 724. The acceptable quality level of the barcode is indicated by BarLevel 725. In step S612, the inspection data including the BarID 721 to the BarLevel 725 for one barcode and described the same number of times as the number of barcodes in the print job is generated as a file, and the integrated control unit 301 transmits the inspection data to the inspection apparatus 0108 via the communication processing unit 302. In addition, the integrated control unit 301 may transmit the inspection data to the inspection apparatus 0108 via the communication processing unit 302, as an inspection setting command, not a file.

In other words, the inspection content of the barcode is configured of the image area flags and the inspection data. The information of the barcode position, the acceptable quality level, the barcode data, and the like are described in the inspection data. The information of the barcode position is mainly described in the image area flags. In this case, in a case where the information relating to the barcode position is described in the inspection data not using the image area flags, the inspection content of the barcode is configured only of the inspection data. Alternatively, if only the barcode position is transmitted, the inspection content of the barcode is configured of only the image area flags.

In step S619, when the job processing is completed, the processing flow ends. In addition, while the information processing apparatus 0109 is operating, this processing is repeated to process the print job input one after another.

FIG. 6B is a flowchart illustrating a processing flow of the inspection apparatus 0108. The processing flow is implemented by the CPU 0226 reading a program stored in the storage unit 0228, loading the program in the RAM 0227, and executing the loaded program.

In step S620, the processing flow starts. In step S621, the integrated control unit 331 stores, in the reference image storage unit 335, the RIP data after the RIP processing received from the printing apparatus 0101 via the communication processing unit 332 as a reference image. The image area flags are attached to the reference image, and the integrated control unit 331 performs processing on the image area flags while storing the received reference image, in a parallel manner. The integrated control unit 331 repeats the processing in step S622 until the communication processing unit 332 receives the inspection content. As described above, the inspection content including the barcode position, the acceptable quality level, and the barcode data is configured of the combination of the image area flags and the inspection data, or only the inspection data. In addition, the inspection content according to the present exemplary embodiment is the inspection information relating to the barcode inspection.

In a case where the inspection content includes the image area flag, in step S623, when the communication processing unit 332 receives the image area flag, the integrated control unit 331 continues to check whether the value indicating the barcode is included until the communication processing unit 332 has received all the image area flags. If the image area flag does not include the value indicating the barcode (NO in step S623), the processing proceeds to step S639 to end the processing flow. If the image area flag includes the value indicating the barcode (YES in step S623), the processing proceeds to step S624.

On the other hand, in a case where the inspection content is configured only of the inspection data, in step S623, the integrated control unit 331 checks whether the barcode information is included in the inspection data received from the information processing apparatus 0109. If the inspection data does not include the barcode information (NO in step S623), the processing proceeds to step S639 to end the processing flow.

In step S624, the integrated control unit 331 detects the barcode position based on the pixel with the image area flag indicating the barcode, and stores the barcode position in the inspection setting storage unit 338. On the other hand, in a case where the inspection content does not include the image area flag, the integrated control unit 331 detects the barcode position from the inspection data, and stores the barcode position in the inspection setting storage unit 338. Thus, in the case where the barcode position is indicated by the image area flags, the inspection data does not include the BarLoc 723. Alternatively, in the case where the value indicating the barcode is not used in the image area flag, the barcode position needs to be indicated by the inspection data, and in this case, the BarLoc 723 is used.

In addition, whether to use the image area flag or the inspection data may be determined considering compatibility with existing designs and design resources. The processing in steps S621 to S624 is repeatedly performed on all the sheets of the job. In step S634, the integrated control unit 331 determines whether all the sheets are processed. In step S634, if all the sheets are not processed (NO in step S634), the processing returns to step S624 to process the next sheet. If all the sheets are processed (YES in step S634), the processing proceeds to step S625. In this way, the processing in step S624 is performed on all the sheets in the job.

Next, in step S625, the integrated control unit 331 detects the acceptable quality level of the barcode from the inspection data, and stores it in the inspection setting storage unit 338. Subsequently, in step S626, the integrated control unit 331 detects the barcode data from the inspection data, and stores it in the inspection setting storage unit 338. Then, in step S627, the integrated control unit 331 obtains the detected barcode position, acceptable quality level, and barcode data from the inspection setting storage unit 338, and displays them via the screen display unit 333, as a candidate for the inspection setting. The user checks the displayed inspection setting candidate, corrects the setting content if needed, and determines the setting content. In step S628, upon receiving the completion of the inspection setting from the user via the input reception unit 334, the integrated control unit 331 stores the inspection setting in the inspection setting storage unit 338.

Through the above-described processing flow, it is possible to easily perform the inspection setting by the inspection apparatus 0108 receiving and processing the inspection information detected by the information processing apparatus 0109 as the inspection content.

Next, in step S629, the integrated control unit 331 of the inspection apparatus 0108 notifies the information processing apparatus 0109 via the communication processing unit 332 that the inspection setting is completed. Then, as described in the processing flows in FIGS. 4A and 4B, the information processing apparatus 0109 performs printing, and the printing apparatus 0101 transmits the layout information to the inspection apparatus 0108. In step S630, the inspection apparatus 0108 receives the layout information, performs inspection layout processing on the reference image stored in step S621, and stores the layout-processed reference image in the reference image storage unit 335. With the inspection layout processing, the page layout actually printed on a print sheet becomes recognizable, and can be compared with the image scanned by the inspection unit 0106.

Next, in step S631, upon receiving the scanned image from the inspection unit 0106 via the inspection I/F processing unit 337, the integrated control unit 331 stores it in the scanned image storage unit 336. In step S632, the integrated control unit 331 compares the reference image stored in the reference image storage unit 335 and the scanned image stored in the scanned image storage unit 336, to perform the barcode inspection with reference to the inspection setting determined in step S628. In step S633, the integrated control unit 331 displays the inspection result on the screen display unit 333. Then, in step S639, the processing flow ends.

As described above, it is possible to easily perform the inspection setting relating to the barcode inspection, perform the inspection according to the inspection setting relating to the barcode inspection after the user's check, and display the inspection result to the user, by the inspection apparatus 0108.

According to one aspect of the present disclosure, it is possible to provide a system that can make a barcode inspection procedure more efficiently, when a reference image is registered to an inspection apparatus.

For example, when a reference image is registered to the inspection apparatus, it is possible to reduce time required for a barcode inspection because information required for the barcode inspection is transmitted from an information processing apparatus to an inspection apparatus.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-125413, filed Aug. 5, 2022, which is hereby incorporated by reference herein in its entirety.

What is claimed is:

1. An inspection apparatus comprising:

one or more processors; and at least one memory storing executable instructions, which when executed by the one or more processors, cause the inspection apparatus to:

perform reception to obtain received print data that include raster-image-processor (RIP) data of a print job;

register an image included in the received print data as a reference image, delete the reference image after completion of an associated inspection job unless a re-inspection request is received, and thereby store at most one reference page per job in memory;

extract, from the received print data, barcode-inspection information including a correct value represented by a barcode, an allowable quality level, and an image-area flag in which a bit value appended to each pixel indicates whether the pixel belongs to the barcode and output a barcode-position indicator derived from the bit values of the image-area flag;

automatically incorporate the extracted barcode-inspection information into an inspection-parameter set without user interaction; and upon reception of a scanned image obtained by scanning a print product, determine a position of the barcode in the scanned image on the basis of the barcode-position indicator, and inspect the barcode by comparing a value obtained by decoding the barcode with the correct value and a decode accuracy with the allowable quality level, and, when the inspection is negative, output a defect-ejection signal to a purge accessory of a printing apparatus.

2. The inspection apparatus according to claim 1, wherein the instructions, when executed by the one or more processors, further cause the inspection apparatus to receive second data different from the received print data, to extract additional barcode-inspection information from the second data, and to integrate the additional barcode-inspection information into the inspection-parameter set.

3. The inspection apparatus according to claim 2, wherein the received print data are raster-image-processor (RIP) data indicating the reference image, and the second data are file data including the barcode-inspection information.

4. The inspection apparatus according to claim 2, wherein the instructions, when executed by the one or more processors, cause the inspection apparatus to obtain the barcode-inspection information for each of pixel from bit values of the image-area flag appended to the pixels of the received print data.

5. The inspection apparatus according to claim 4, wherein the instructions, when executed by the one or more processors, cause the inspection apparatus to determine a position of the barcode in the reference image on the bases of the bit values and set the inspection-parameter set.

6. The inspection apparatus according to claim 1, wherein the barcode-inspection information contains a correct answer value for a value represented by the barcode, and wherein the instructions, when executed by the one or more processors, cause the inspection apparatus to inspect whether the value obtained by decoding the barcode in the scanned image matches the correct answer value.

7. The inspection apparatus according to claim 1, wherein the instructions, when executed by the one or more processors, cause the inspection apparatus to inspect the print product on the bases of the received scanned image and the reference image.

8. The inspection apparatus according to claim 1, wherein the barcode-inspection information contains an allowable quality level of the barcode, and wherein the instructions, when executed by the one or more processors, cause the inspection apparatus to inspect whether a decode accuracy of the barcode in the scanned image satisfies the allowable quality level.

* * * * *